A. B. HENDRYX & A. W. WEBSTER.

Improvement in Machines for Compressing Metal Pointing Wire, &c.

No. 133,224.          Patented Nov. 19, 1872.

Witnesses.
C. F. Brown
N. H. Ellsworth

Inventors.
A. B. Hendryx.
A. W. Webster.
by their Attys.
Hill & Ellsworth

UNITED STATES PATENT OFFICE.

ANDREW B. HENDRYX AND ALBERT W. WEBSTER, OF ANSONIA, CONNECTICUT; SAID HENDRYX ASSIGNOR TO SAID WEBSTER.

IMPROVEMENT IN MACHINES FOR COMPRESSING METAL, POINTING WIRE, &c.

Specification forming part of Letters Patent No. 133,224, dated November 19, 1872.

*To all whom it may concern:*

Be it known that we, ANDREW B. HENDRYX and ALBERT W. WEBSTER, both of the village of Ansonia and town of Derby, in the county of New Haven and State of Connecticut, have invented a new and useful Machine for Compressing Articles of Metal; and we do hereby declare the following to be a full, clear, and exact description of the same, reference being had to the accompanying drawing forming part of this specification, in which—

Figure 1:
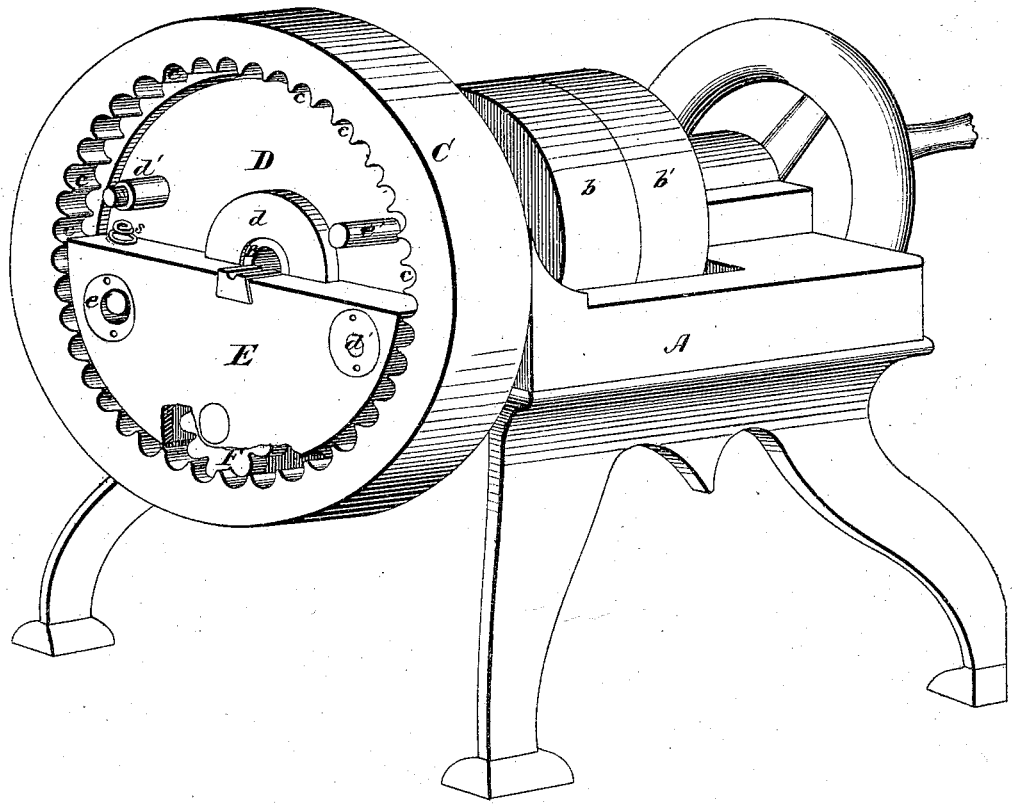
Figure 2:
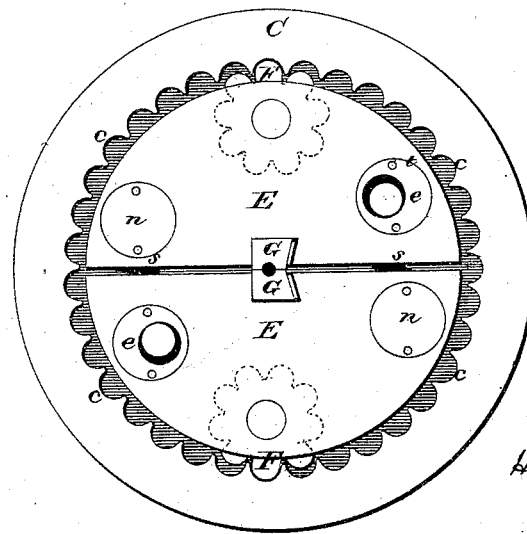

Figure 1 is a perspective view, representing the machine with one of the jaws removed; and Fig. 2 is a front elevation of the machine.

Similar letters of reference in the accompanying drawing indicate the same parts.

The object of this invention is to improve the means for reducing articles of metal by compression; and to this end the invention consists in the improved machine which we will now proceed to describe.

In the drawing, A represents a suitable frame, upon which is mounted a hollow shaft, B, having a fast-and-loose pulley, b b', and adapted to be driven by any suitable power. A stout ring, C, having its front edge internally corrugated or engrailed, is fixed to the frame in a position concentric with the shaft, so that its face extends slightly beyond the end of the shaft. Within this ring is a stout metal disk, D, attached to and revolving with the shaft, said disk having a small hub or central projection, d, on its front side, which surrounds the end of the shaft, as shown in Fig. 1. Two semicircular jaws, E, are pivoted to the face of the disk by means of two pins, d' d', arranged diametrically opposite to each other, the jaws having a central recess in their inner face, which fits loosely around the hub d so as to permit them to swing on their pivots to a slight extent. The jaws are secured to the disk by means of nuts n n screwed upon the ends of the pins and countersunk in the faces of the jaws, as shown. Each jaw has a recess at its center to receive a suitable die, G, for reducing the metal, said die being adapted to reducing sewing-machine needles, forming seamless tubing, pointing wire for wire-drawing, making horseshoe-nails, and, in general, reducing rods or tubes of metal to smaller dimensions and to any shape which it is practicable to give by means of compressing or swaging dies. The dies, suitably attached to the jaws, are operated by alternately closing the jaws together and retracting them, which movements are effected in the following manner: The forcing of the jaws apart after each stroke is effected by means of small springs s s, of any suitable form and material, arranged between them and held in position by any of the means usually employed for such purposes. The closing of the jaws together to compress the metal is effected by means of small cog-wheels F projecting from recesses or chambers cut in the edges of the jaws, as represented, and engaging with the corrugations c of the ring. The ends of the cogs are rounded off to fit accurately into the corrugations, and they are so arranged as to strike against the bottom of each corrugation just before the axis of the cog is in true with it, so that the jaw will be obliged to yield and swing back slightly on its pivot to let the cog-wheel pass each one of the corrugations as the disk revolves. This, in connection with the springs, gives the jaws an exceedingly rapid and continuous vibrating movement. The extent of the vibration effected in this manner can be perfectly adjusted and controlled by means of circular blocks e set into the jaws and secured by set-screws t. An eccentric opening is made in these blocks, which accommodates a projecting pin, e', fixed to the disk. By loosening the set-screw and turning the block round more or less, to vary the eccentricity of its opening with relation to the pin, the movement of the jaw is kept within any required limits and the cog-wheels made to bear against the engrailed rim with any degree of force.

The details of construction of the several parts, and even the arrangement of some of the parts, may be varied considerably without departing from the principle of our invention. For example, the shaft B, disk D, and the parts which they support, may be fixed, while the ring C is made to revolve around them. So, too, raised teeth or corrugations may be made in the periphery of the jaws diametrically opposite to the dies to come in contact with the toothed wheels projecting through the surrounding ring C. In either case the operation of the parts would be substantially as described above, although the mode of construction shown in the drawing is deemed preferable, as being simpler and less liable to get out of order.

The machine does its work very rapidly and perfectly, with the outlay of comparatively little power. Its construction is such that the parts are strong and durable, and not liable to get out of order or need frequent repairs; and such repairs as may from time to time be necessary can be easily and cheaply made. The quality of work done by the machine is of the very best.

Having thus described our invention, what we claim is—

1. The internally toothed or corrugated ring C and the externally-toothed pinions F F, in combination with the jaws E E, or their equivalent, substantially as and for the purposes set forth.

2. The divided head or pair of jaws E E pivoted to the plate D by the standing bolts or pins $d'$, said plate D being attached to the end of the hollow shaft B and arranged with the jaws within the ring C so that the rotation of the ring or jaws will operate the dies, substantially as described.

3. The springs $s\ s$, arranged between the two jaws, in combination with the jaws, the toothed wheels, and the corrugated or toothed rim, substantially as described, and for the purposes set forth.

4. The circular eccentric blocks $e$, in combination with the jaws E, pins $e'$, and set-screws $t$, substantially as and for the purposes specified.

5. The shaft B, disk D, pins $d'\ e'$, jaws E, eccentrics $e$, wheels F, toothed rim C, and dies G G, all combined and operating substantially as described.

ANDR. B. HENDRYX.
ALBERT W. WEBSTER.

Witnesses to both signatures:
LOCKWOOD HOTCHKISS,
N. S. JOHNSON.